US012623972B2

(12) United States Patent
Leloup et al.

(10) Patent No.: US 12,623,972 B2
(45) Date of Patent: May 12, 2026

(54) PREPREG FOR CERAMIC MATRIX COMPOSITE

(71) Applicant: SAINT-GOBAIN CENTRE DE RECHERCHES ET D'ETUDES EUROPEEN, Courbevoie (FR)

(72) Inventors: Jérôme Leloup, Le Thor (FR); Franceline Marguerite Louise Villermaux, Avignon (FR); Christian His, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 829 days.

(21) Appl. No.: 17/795,201

(22) PCT Filed: Jan. 26, 2021

(86) PCT No.: PCT/EP2021/051768
§ 371 (c)(1),
(2) Date: Jul. 25, 2022

(87) PCT Pub. No.: WO2021/151899
PCT Pub. Date: Aug. 5, 2021

(65) Prior Publication Data
US 2023/0078422 A1 Mar. 16, 2023

(30) Foreign Application Priority Data

Jan. 27, 2020 (FR) ...................................... 2000777

(51) Int. Cl.
*C04B 35/80* (2006.01)
*C04B 35/117* (2006.01)
*C04B 35/14* (2006.01)
*C04B 35/58* (2006.01)
*C04B 35/624* (2006.01)

(52) U.S. Cl.
CPC ........... *C04B 35/80* (2013.01); *C04B 35/117* (2013.01); *C04B 35/14* (2013.01); *C04B 35/58078* (2013.01); *C04B 35/624* (2013.01); *C04B 2235/5224* (2013.01); *C04B 2235/5268* (2013.01); *C04B 2235/5436* (2013.01); *C04B 2235/6025* (2013.01); *C04B 2235/6028* (2013.01); *C04B 2235/606* (2013.01)

(58) Field of Classification Search
CPC .... C04B 2235/3418; C04B 2235/5216; C04B 2235/522; C04B 2235/5228; C04B 2235/5232; C04B 2235/524; C04B 2235/5248; C04B 2235/526; C04B 2235/5264; C04B 2235/5445; C04B 2235/5463; C04B 2235/616; C04B 2235/6562; C04B 2235/6567
See application file for complete search history.

(56) References Cited

U.S. PATENT DOCUMENTS 6,201,050 B1 * 3/2001 Kaiser .................. B01J 13/0056
524/556
10,590,044 B1 * 3/2020 Raj ..................... C04B 41/4523
2007/0142600 A1 6/2007 Green et al.
2017/0144329 A1 * 5/2017 Dunn ............... C04B 35/62873
2019/0210930 A1 7/2019 Knohl et al.

FOREIGN PATENT DOCUMENTS

EP 1329439 A1 7/2003
EP 2943448 A1 11/2015
FR 2873686 A1 2/2006
WO 2014110478 A1 7/2014
WO 2019175501 A1 9/2019

OTHER PUBLICATIONS

English Machine Translation of FR 2873686.*
Jenkins, Barrie Mullinger, Peter. (2023). Industrial and Process Furnaces—Principles, Design and Operation (3rd Edition). Elsevier.*
Patience, Gregory S.. (2018). Experimental Methods and Instrumentation for Chemical Engineers (2nd Edition). Elsevier.*
Chinese Office Action, from Corresponding Chinese Application No. 202180011339.X, dated Jul. 26, 2023.
International Search Report corresponding to International Application No. PCT/EP2021/051768, dated Apr. 9, 2021, 7 pages.
3m., "3M (TM) Nextel (TM) Ceramic Fibers and Textiles Technical Reference Guide", Technical Reference Guide, US, Nov. 1, 2018, pp. 1-24, https://multimedia.3m.com/mws/media/13270550/3m-nextel-technical-reference-guide.pdf.
Eric N. Gilbert, et al., "Metal Particle Modification of Composite Matrices for Customized Density Applications", polymer composites, Apr. 15, 2004, https://doi.org/10.1002/pc.10419.

* cited by examiner

*Primary Examiner* — Jennifer A Gillett
(74) *Attorney, Agent, or Firm* — Ronald M. Kachmarik; Cooper Legal Group LLC

(57) ABSTRACT

A prepreg including a support with, for more than 90% of the weight thereof, of ceramic fibers, and a thermoreversible liquefiable gel covering, at least in part, at least one portion of the ceramic fibers. The liquefiable gel including: 20% to 60% of ceramic particles and 0% to 10% of metal particles, both as percentage by volume based on the volume of the liquefiable gel; 0.2% to 10% of a thermoreversible hydrocolloid and 0% to 7% of one or more other constituents, both as a percentage by weight on the basis of the total weight of the ceramic particles and metal particles; the balance to 100% being water. It being possible for the ceramic particles and the metal particles to be replaced, partially or completely, by precursors of ceramic particles and of metal particles, respectively, capable of forming, by heat treatment above 200° C., ceramic particles and metal particles, respectively.

23 Claims, No Drawings

PREPREG FOR CERAMIC MATRIX COMPOSITE

TECHNICAL FIELD

The invention relates to a prepreg intended in particular for the manufacture of a ceramic matrix component, in particular a ceramic matrix composite, or CMC. The invention also relates to a method for manufacturing such a prepreg and to a method for manufacturing a ceramic matrix component, in particular a CMC, from said prepreg.

PRIOR ART

A ceramic matrix component is a product essentially composed of ceramic fibers bonded together by a ceramic matrix. When it is sintered, it is known as "CMC". A CMC exhibits high mechanical properties even at high temperatures.

A ceramic matrix component may be manufactured by superposing prepregs each consisting of a fabric impregnated with a slurry of ceramic particles. The prepregs are flexible so as to be able to assume the desired shape. They may then be dried and preferably sintered to form a CMC.

However, a ceramic matrix component, and in particular a CMC, manufactured from prepregs that have been stored for a long period or under poor conditions, exhibits degraded mechanical properties.

There is therefore a continuing need for a prepreg exhibiting a better storability.

The present invention is targeted at meeting this need, at least partially.

DISCLOSURE OF THE INVENTION

Summary of the Invention

According to the invention, this aim is achieved by means of a prepreg comprising a support consisting, for more than 90%, more than 95% and preferably 100%, of its mass, of ceramic fibers, and a thermoreversible liquefiable gel covering, at least in part, at least a portion of said ceramic fibers, said liquefiable gel consisting of:

20% to 60% of ceramic particles, as percentage by volume based on the volume of the liquefiable gel;

0% to 10% of metallic particles, as percentage by volume based on the volume of the liquefiable gel;

0.2% to 10% of a thermoreversible hydrocolloid, as percentage by mass based on the total mass of the ceramic particles and of the metallic particles;

0% to 7% of one or more other, preferably organic, constituents, as percentage by mass based on the total mass of the ceramic particles and of the metallic particles;

the remainder to 100% being water, it being possible for the ceramic particles and the metallic particles to be partially or entirely replaced by precursors, in the form of particles or otherwise, of ceramic particles and of metallic particles, respectively, that are able to form, by heat treatment at a temperature of preferably greater than 200° C., preferably greater than 300° C., preferably greater than 400° C., ceramic particles and metallic particles, respectively.

As will be seen in more detail in the remainder of the description, the inventors have discovered that such a prepreg retains its properties, in particular its deformability and bonding properties, even after a long period of storage.

Without being bound by this theory, the inventors believe that the liquefiable gel limits the flow between the ceramic fibers of the support and/or on the support, and hence the migration of the ceramic and metallic particles. In addition, the water remains, at least partially, trapped within the gel, which limits evaporation and makes it possible to retain a composition which is substantially constant over time. The prepreg therefore advantageously remains homogeneous.

Moreover, the composition of the liquefiable gel allows it to become liquid again by simple heating, and hence to become readily deformable again. However, the inventors have discovered that the specificity of this composition is not detrimental to the qualities of the ceramic matrix component, in particular of the CMC obtained.

This transformation of the liquefiable gel is thermoreversible, the liquid obtained being a liquid which is gellable simply by cooling.

The prepreg thus remains well suited to the manufacture of a ceramic matrix component, in particular of a CMC.

Lastly, the retention of the water limits, or even eliminates, the need to add water during the manufacture of the ceramic matrix component. The method for manufacturing the ceramic matrix component is advantageously simplified as a result.

A prepreg according to the invention may also comprise one or more of the following optional and preferred features:

the liquefiable gel comprises:

ceramic particles, in an amount of greater than 25% and less than 55%, as percentage by volume based on the volume of the liquefiable gel; and/or metallic particles, in an amount of greater than 0.5% and less than 9%, as percentage by volume based on the volume of the liquefiable gel; and/or a thermoreversible hydrocolloid, in an amount of greater than 0.4% and less than 7%, as percentage by mass based on the total mass of the ceramic particles and of the metallic particles; and/or one or more other, preferably organic, constituents, in an amount of greater than 0.5% and less than 6%, as percentage by mass based on the total mass of the ceramic particles and of the metallic particles;

the thermoreversible hydrocolloid is in an amount of greater than 0.5% and less than 4%, as percentage by mass based on the total mass of the ceramic particles and of the metallic particles and/or the other constituent(s) are organic and chosen from dispersants, binders, biocidal agents, antifoam agents, thickeners, plasticizers, drying regulators and mixtures thereof;

the ceramic particles of the liquefiable gel are chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles;

the thermoreversible hydrocolloid of the liquefiable gel is chosen from a gelatin, agar, a mixture of carrageenan and of a compound providing sodium cations and/or potassium cations and/or calcium cations, a mixture of furcellaria and of a sugar, a mixture of konjac gum and of xanthan gum, preferably in a mass ratio of greater than 0.8 and less than 1.2, a mixture of locust bean gum and of xanthan gum, preferably in a mass ratio of greater than 0.67 and less than 1.5, and a mixture of chitosan and of pectin, preferably having a mass ratio of the amount of pectin to the amount of pectin and of chitosan of greater than 0.2 and less than 0.8;

more than 90% by volume of the ceramic particles of the liquefiable gel consist of oxide(s) for more than 90% of their mass;

the thermoreversible hydrocolloid of the liquefiable gel is chosen from a gelatin, a mixture of chitosan and of pectin, preferably having a mass ratio of the amount of pectin to the amount of pectin and of chitosan of greater than 0.2 and less than 0.8, preferably a gelatin;

in the liquefiable gel, the ratio of the amount by mass of the "other constituents" to the amount by mass of thermoreversible hydrocolloid is less than 1, preferably less than 0.9, preferably less than 0.8, preferably less than 0.6, preferably less than 0.4, the amounts of thermoreversible hydrocolloid and of the "other constituents" being expressed as percentage by mass based on the total mass of the ceramic particles and of the metallic particles;

in the liquefiable gel, the ratio of the amount by mass of plasticizer of the liquefiable gel, preferably of polyol, to the amount by mass of thermoreversible hydrocolloid is less than 1, preferably less than 0.9, preferably less than 0.8, preferably less than 0.6, preferably less than 0.4, the amounts of thermoreversible hydrocolloid and of plasticizer being expressed as percentage by mass based on the total mass of the ceramic particles and of the metallic particles;

in the liquefiable gel, the water content by volume is greater than 40%, preferably greater than 50%, and/or preferably less than 70%, preferably less than 60%;

in the liquefiable gel, the total content of thermoreversible hydrocolloid and of organic "other constituents", preferably the total content of thermoreversible hydrocolloid and of "other constituents", is less than 15%, preferably less than 10%, preferably less than 7%, preferably less than 5%, as percentage by mass based on the total mass of the ceramic particles and of the metallic particles of the liquefiable gel;

more than 95% by volume of the ceramic particles consist of oxide(s) for more than 99% of their mass, and exhibit a chemical analysis such that $Al_2O_3 + SiO_2 \geq 95\%$, as percentage by mass based on the oxides;

more than 90% by number of the ceramic fibers of the support, optionally assembled in the form of yarns, have a length of greater than 10 mm and an equivalent diameter, measured at half-length, of greater than 2 μm and less than 50 μm;

the ceramic fibers of the support consist, for more than 90% of their mass, of oxide(s) and/or of nitride(s) and/or of carbide(s) and/or of boride(s) and/or of carbon;

the support is a single yarn, a web of yarns, a braid of yarns, a knit of yarns or an entanglement of fibers, and said yarn or more than 50% of the yarns or of the ceramic fibers, as percentage by number, is/are coated, for more than 50% of their outer surfaces, with liquefiable gel;

the ceramic fibers of the support, optionally assembled in the form of yarns, consist of oxide(s) for more than 95% of their mass, and exhibit a chemical analysis such that $Al_2O_3 + SK)_2 \geq 95\%$, as percentage by mass based on the oxides;

the ceramic fibers of the support, optionally assembled in the form of yarns, are chosen from glass fibers, amorphous silica fibers, corundum fibers, mullite fibers, mullite-corundum fibers and mixtures thereof;

the support consists of a plurality of superposed webs, preferably more than 2 webs and less than 10 webs;

in the liquefiable gel,
the ceramic particles are in an amount of greater than 25% and less than 55%, as percentage by volume based on the volume of the liquefiable gel, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles; the whole of said ceramic particles exhibiting, by volume, a median size $D_{50}$ of less than 5 μm and greater than 0.1 μm, and a 99 percentile, $D_{99}$, of less than 50 μm; and the thermoreversible hydrocolloid is present in an amount of greater than 0.4% and less than 9%, as percentage by mass based on the mass of the ceramic particles; said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and the other constituents are organic and present in an amount of greater than 0.1% and less than 6%, as percentage by mass based on the mass of the ceramic particles, said other constituents being chosen from dispersants, binders, biocidal agents, antifoam agents, thickeners, plasticizers, drying regulators and mixtures thereof; and in the support,
more than 90% by number of the ceramic fibers of the support, optionally assembled in the form of yarns, have a length of greater than 10 mm and an equivalent diameter, measured at half-length, of greater than 2 μm and less than 50 μm; and the ceramic fibers, optionally assembled in the form of yarns, represent more than 90% of the mass of the support, said ceramic fibers, optionally assembled in the form of yarns, consisting for more than 90% of their mass of oxide(s) and/or of nitride(s) and/or of carbide(s) and/or of boride(s) and/or of carbon;

the support being a single yarn, a web of yarns, a braid of yarns, a knit of yarns or an entanglement of fibers, said single yarn or more than 50% of the yarns or of the fibers, as percentage by number, being coated, for more than 50% of their outer surfaces, with liquefiable gel;

in the liquefiable gel,
the ceramic particles are in an amount of greater than 25% and less than 55%, as percentage by volume based on the volume of the liquefiable gel, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles; and

the metallic particles are in an amount of greater than 0.5% and less than 9%, as percentage by volume based on the volume of the liquefiable gel, the whole of said ceramic and metallic particles exhibiting, by volume, a median size $D_{50}$ of less than 5 µm and greater than 0.1 µm, and a 99 percentile, $D_{99}$, of less than 50 µm; and the thermoreversible hydrocolloid is present in an amount of greater than 0.4% and less than 9%, as percentage by mass based on the sum of the mass of the ceramic particles and of the mass of the metallic particles, and being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and the other constituents are organic and present in an amount of greater than 0.1% and less than 6%, as percentage by mass based on the sum of the mass of the ceramic particles and of the mass of the metallic particles, said other constituents being chosen from dispersants, binders, biocidal agents, antifoam agents, thickeners, plasticizers, drying regulators and mixtures thereof; and in the support, more than 90% by number of the ceramic fibers of the support, optionally assembled in the form of yarns, have a length of greater than 10 mm and an equivalent diameter, measured at half-length, of greater than 2 µm and less than 50 µm; and the ceramic fibers, optionally assembled in the form of yarns, represent more than 90% of the mass of the support, said ceramic fibers, optionally assembled in the form of yarns, consisting for more than 90% of their mass of oxide(s) and/or of nitride(s) and/or of carbide(s) and/or of boride(s) and/or of carbon;

the support being a single yarn, a web of yarns, a braid of yarns, a knit of yarns or an entanglement of fibers, said single yarn or more than 50% of the yarns or of the fibers, as percentage by number, being coated, for more than 50% of their outer surfaces, with liquefiable gel;

in the liquefiable gel, the ceramic particles are in an amount of greater than 30% and less than 50%, as percentage by volume based on the volume of the liquefiable gel, more than 95% by volume of the ceramic particles consisting of oxide(s) for more than 99% of their mass, and exhibiting a chemical analysis such that $Al_2O_3+SiO_2 \geq 95\%$, as percentage by mass based on the oxides; and the whole of the ceramic particles exhibiting, by volume, a median size $D_{50}$ of less than 5 µm and greater than 0.1 µm, and a 99 percentile, $D_{99}$, of less than 50 µm; and the thermoreversible hydrocolloid is present in an amount of greater than 0.5% and less than 4%, as percentage by mass based on the mass of the ceramic particles, said thermoreversible hydrocolloid being a gelatin; and the other constituents are organic and present in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof; and in the support, more than 90% by number of the ceramic fibers of the support, optionally assembled in the form of yarns, have a length of greater than 10 mm and an equivalent diameter, measured at half-length, of greater than 2 µm and less than 30 µm; and the ceramic fibers, optionally assembled in the form of yarns, represent more than 90% of the mass of the support, and said fibers, optionally assembled in the form of yarns, consisting of oxide(s) for more than 95% of their mass and exhibiting a chemical analysis such that $Al_2O_3+SiO_2 \geq 95\%$, as percentage by mass based on the oxides;

the support being a single yarn, a web of yarns, a braid of yarns, a knit of yarns or an entanglement of fibers, said yarn or more than 50% of the yarns or of the fibers, as percentage by number, being coated, for more than 50% of their outer surfaces, with liquefiable gel.

The invention also relates to a method for manufacturing a prepreg, in particular a prepreg according to the invention, intended for the manufacture of a ceramic matrix component, in particular of a CMC, said method comprising the following steps:

1) preparing a gellable liquid having the following composition:

20% to 60% of ceramic particles, as percentage by volume based on the volume of the gellable liquid;

0% to 10% of metallic particles, as percentage by volume based on the volume of the gellable liquid;

0.2% to 10% of a thermoreversible hydrocolloid, as percentage by mass based on the total mass of the ceramic particles and of the metallic particles;

0% to 7% of one or more other, preferably organic, constituents, as percentage by mass based on the total mass of the ceramic particles and of the metallic particles;

the remainder to 100% being water;

2) applying said gellable liquid to ceramic fibers of a fibrous support;

3) gelling said gellable liquid in the form of a liquefiable gel by reducing the temperature of said gellable liquid, so as to obtain the prepreg;

4) preferably, storing the prepreg.

Preferably, the thermoreversible hydrocolloid is chosen so that the gelling temperature of the gellable liquid is greater than 20° C. and less than 60° C.

The invention relates to a method for manufacturing a ceramic matrix component, and in particular a ceramic matrix composite, said method comprising the following steps:

5) liquefying the liquefiable gel of a prepreg according to the invention or manufactured according to steps 1) to 3) and preferably 4), so as to transform the liquefiable gel into gellable liquid;

6) shaping said prepreg so as to obtain a deformable preform;

7) optionally, gelling the gellable liquid, so as to obtain a stiffened preform;

8) drying the preform obtained from step 6) or optionally from step 7), so as to obtain a ceramic matrix component;

9) optionally, sintering the ceramic matrix component obtained from step 8).

A method for manufacturing a ceramic matrix component according to the invention comprises, before step 5), steps 1) to 3) of a method for manufacturing a prepreg according to the invention, and, in one embodiment, a step 4) of storing this prepreg for a period of greater than 1 week, greater than 1 month, greater than 2 months, greater than 6 months, greater than 12 months.

The invention also relates to an intermediate product resulting from step 5) and to a preform resulting from step 6) or 7).

Definitions

According to the invention, the term "prepreg" is understood to mean a support consisting essentially of ceramic fibers, at least partially impregnated with a thermoreversible liquefiable gel or a thermoreversible gellable liquid, said thermoreversible liquefiable gel and thermoreversible gellable liquid comprising ceramic particles and/or precursors of ceramic particles, and optionally metallic particles and/or precursors of metallic particles.

The support may for example be in the form of a yarn, a web, for example a fabric, a block of felt, a braid, a knit or an assembly of these elements. A ceramic matrix component, and in particular a CMC, may be manufactured with a single prepreg or by superposition of two or more prepregs.

The term "ceramic" is understood to mean a material which is neither metallic nor organic. In the context of the present invention, carbon, glasses and amorphous silica are considered to be ceramic materials.

The term "thermoreversible hydrocolloid" is understood to mean the whole consisting of the (dry) constituents which, after addition of an amount of water, participate in the formation of a thermoreversible liquefiable gel, that is to say without which the addition of water does not lead to the formation of a thermoreversible liquefiable gel. A gelatin or a mixture of locust bean gum and of xanthan gum are examples of thermoreversible hydrocolloids. A thermoreversible hydrocolloid comprises a hydrocolloid. However, not all of the hydrocolloids in a thermoreversible hydrocolloid are necessarily "thermoreversible hydrocolloids" themselves. For example, locust bean gum and xanthan gum are not thermoreversible when they are used in isolation. It is the thermoreversibility of the liquefiable gel which is to be evaluated. For example, a gelatin is a thermoreversible hydrocolloid only insofar as it results, with the other constituents of the liquefiable gel, in a thermoreversible liquefiable gel.

The "other constituents" are the constituents other than the ceramic particles, the precursors of ceramic particles, the metallic particles, the precursors of metallic particles, the thermoreversible hydrocolloid and water.

The contents of thermoreversible hydrocolloid and of "other constituents" are always expressed as percentage by mass based on the total mass of the ceramic particles and of the metallic particles;

The term "gelling temperature" of a thermoreversible hydrocolloid sol or of a gellable liquid refers to the temperature starting from which this sol or this gellable liquid starts to gel, when decreasing the temperature.

The term "liquefaction temperature" of a liquefiable gel refers to the temperature starting from which the liquefiable gel starts to liquefy when increasing the temperature.

A "fiber" is a filament the length of which is greater than 5 times its equivalent diameter.

The "equivalent diameter" of a fiber is the diameter of a disk having the same surface area as its cross section at mid-length.

A "yarn" is an assembly of fibers which, in cross section, comprises more than 10 and preferably less than 500 000 fibers, and the length of which is greater than 5 times the diameter.

A "long fiber" is a fiber the length of which is greater than 1 mm. A "long yarn" is a yarn consisting of long fibers.

A "continuous fiber" is a fiber the length of which is greater than 10 mm. A "continuous yarn" is a yarn the length of which is greater than 10 mm, consisting of continuous fibers or of an aligned assembly of short and/or long fibers (or "staple yarn").

In the context of the present description, "sintering" refers to the consolidation, by heat treatment at more than 700° C., of a preform, possibly with partial or total melting of some of its constituents (but not all of its constituents).

The 50 (denoted $D_{50}$) and 99 (denoted $D_{99}$) "percentiles" refer to the particle sizes corresponding to the percentages equal respectively to 50% and 99%, by volume, on the cumulative particle size distribution curve of the particle sizes of a set of particles, said particle sizes being classified by increasing order. According to this definition, 99% by volume of the particles of the set of particles thus have a size of less than $D_{99}$ and 1% of the particles, by volume, have a size of greater than or equal to $D_9$. In a powder, the percentiles may be determined by means of a particle size distribution produced using a Camsizer® XT sold by Horiba.

The "median size" of a set of particles refers to the 50 percentile. The median size therefore divides the particles of said set of particles into first and second populations equal by volume, these first and second populations comprising only particles exhibiting a size of greater than or equal to, or respectively less than, the median size.

The particles may be the individual elements of a powder, but also, by extension, these elements within a gellable liquid or a liquefiable gel.

Unless stated otherwise, all oxide contents are mass percentages based on the oxides. A content by mass of an oxide of a metallic element refers to the total content of this element expressed in the form of the most stable oxide, in accordance with the standard industry convention.

A sum of oxide contents does not imply the presence of all of these oxides. For example, "$Al_2O_3+SiO_2$" is the sum of the contents of $Al_2O_3$ and of $SiO_2$, but does not rule out the absence of one of these oxides.

"Include" or "comprise" or "have"/"exhibit" should be interpreted in a nonlimiting manner.

Unless stated otherwise, all means are arithmetic means.

DETAILED DESCRIPTION

Method for Manufacturing a Prepreg

A method for manufacturing a prepreg according to the invention comprises steps 1) to 3), and preferably step 4), above.

In step 1), the gellable liquid is prepared:

The gellable liquid can be produced by mixing, in water, the thermoreversible hydrocolloid, the ceramic particles, and optionally the metallic particles and the other, preferably organic, constituent(s). Any conventional mixing techniques may be employed.

The ceramic particles are intended to form the binding matrix of the ceramic matrix component, in particular of the CMC.

Preferably, the amount of ceramic particles is greater than 25%, preferably greater than 30%, and/or less than 55%, preferably less than 50%, as percentage by volume based on the volume of the gellable liquid.

Preferably, the ceramic particles are chosen from particles consisting of oxide(s) for more than 90%, preferably for more than 95%, preferably for more than 99%, preferably for substantially 100% of their mass, particles consisting of nitride(s) for more than 90%, preferably for more than 95%, preferably for more than 99%, preferably for substantially 100% of their mass, particles consisting of carbide(s) for more than 90%, preferably for more than 95%, preferably for more than 99%, preferably for substantially 100% of their mass, particles consisting of boride(s) for more than 90%, preferably for more than 95%, preferably for more than 99%, preferably for substantially 100% of their mass, and mixtures of these particles.

Preferably, when the ceramic particles comprise an oxide, they comprise an oxide chosen from $Al_2O_3$, $SiO_2$, $ZrO_2$, $Y_2O_3$, CaO, MgO, SrO, BaO, $K_2O$, rare earth oxides, $TiO_2$, $Na_2O$, $Cr_2O_3$ and mixtures thereof.

Preferably, when the ceramic particles comprise a nitride, they comprise a nitride chosen from AlN, BN, $Si_3N_4$ and mixtures thereof.

Preferably, when the ceramic particles comprise a carbide, they comprise a carbide chosen from SIC, $B_4C$, TIC, TaC, ZrC and mixtures thereof.

Preferably, when the ceramic particles comprise a boride, they comprise $ZrB_2$.

More preferably, more than 90%, preferably more than 95%, preferably more than 99%, preferably substantially 100%, by volume, of the ceramic particles consist of oxide(s) for more than 90%, preferably for more than 95%, preferably for more than 99%, preferably for substantially 100% of their mass.

Preferably, more than 90%, preferably more than 95%, preferably more than 99%, preferably substantially 100%, by volume, of the ceramic particles consist of oxide(s) for more than 90%, preferably for more than 95%, preferably for more than 99%, preferably for substantially 100% of their mass, and exhibit a chemical analysis such that $Al_2O_3+SiO_2+ZrO_2+Y_2O_3+CaO+MgO+SrO+BaO+K_2O+$the rare earth oxides$+TiO_2+Na_2O+Cr_2O_3\geq90\%$, preferably $\geq95\%$, preferably $\geq99\%$, as percentage by mass based on the oxides. Preferably, this sum of oxide contents is substantially equal to 100%, as percentage by mass based on the oxides.

More preferably, more than 90%, preferably more than 95%, preferably more than 99%, preferably substantially 100%, by volume, of the ceramic particles consist of oxide(s) for more than 90%, preferably for more than 95%, preferably for more than 99%, preferably for substantially 100% of their mass, and exhibit a chemical analysis such that $Al_2O_3+SiO_2\geq90\%$, preferably $\geq95\%$, preferably $\geq99\%$, as percentage by mass based on the oxides. Preferably, this sum of oxide contents is substantially equal to 100%, as percentage by mass based on the oxides.

In one embodiment, more than 90%, preferably more than 95%, preferably more than 99%, preferably substantially 100%, by volume, of the ceramic particles consist of oxide(s) for more than 90%, preferably for more than 95%, preferably for more than 99%, preferably for substantially 100% of their mass, and exhibit a chemical analysis such that $SiO_2\geq90\%$, preferably $\geq95\%$, preferably $\geq99\%$, as percentage by mass based on the oxides.

In one embodiment, more than 90%, preferably more than 95%, preferably more than 99%, preferably substantially 100%, by volume, of the ceramic particles consist of oxide(s) for more than 90%, preferably for more than 95%, preferably for more than 99%, preferably for substantially 100% of their mass, and exhibit a chemical analysis such that $Al_2O_3\geq90\%$, preferably $\geq95\%$, preferably $\geq99\%$, as percentage by mass based on the oxides.

The ceramic particles may be replaced, partially or entirely, by precursors of ceramic particles, that is to say by constituents which, during the manufacture of the prepreg or more generally during the manufacture or the use of the ceramic matrix component, in particular of the CMC, result in ceramic particles or in a ceramic matrix, respectively. Boehmite, alumina trihydrate, tetraethyl orthosilicate or TEOS, and orthosilicic acid are examples of known precursors of alumina, alumina, silica, and silica, respectively.

In one embodiment, the gellable liquid comprises metallic particles, in an amount of preferably greater than 0.5%, or even greater than 1% and/or preferably less than 9%, or even less than 8%, or even less than 5%, as percentage by volume based on the volume of the gellable liquid.

The metallic particles, that is to say particles made of a metal or of a metal alloy, are intended to be incorporated within the ceramic matrix of the ceramic matrix component, in particular of the CMC. They may modify properties thereof, for example the thermal conductivity and/or the electrical conductivity. If metallic particles are precursors of ceramic particles, and in particular transform into ceramic particles during a sintering operation, preferably during a reactive sintering operation, they are exclusively counted among the precursors of ceramic particles.

Reactive sintering may in particular be suitable for transforming, by combination with an element of the gaseous environment, in particular nitrogen and/or oxygen, metallic particles into ceramic particles.

More preferably, all or some of the metallic particles comprise, preferably are made of, a material chosen from silicon, aluminum, iron and mixtures thereof, in particular alloys thereof.

The whole of the metallic particles may consist of particles that all have the same composition or of a mixture of particles having different compositions.

The metallic particles may be replaced, partially or entirely, by precursors of metallic particles, that is to say by constituents which, during the manufacture of the prepreg or more generally during the manufacture or the use of the ceramic matrix component, in particular of the CMC, result in a metallic phase. A sulfate of a metal, such as aluminum sulfate, a chlorohydrate of a metal, such as an aluminum chlorohydrate, and a bromohydrate of a metal, such as aluminum bromohydrate, are examples of metal precursors.

Preferably, the gellable liquid does not comprise precursors of metallic particles.

In a preferred embodiment, the gellable liquid does not comprise metallic particles or precursors of such particles.

Preferably, the whole of the ceramic and metallic particles has, by volume, a median size $D_{50}$ of less than 10 μm, preferably less than 8 μm, preferably less than 6 μm, preferably less than 5 μm, preferably less than 4 μm, preferably less than 3 μm and preferably greater than 0.1 μm, preferably greater than 0.2 μm, and/or a 99 percentile, $D_{99}$, of less than 70 μm, preferably less than 60 μm, preferably less than 50 μm, preferably less than 40 μm, preferably less than 30 μm. The whole of the ceramic and metallic particles in the gellable liquid may have a monomodal, but also multimodal, size distribution.

The whole of the ceramic and metallic particles may have a bimodal distribution, preferably with a "first peak" centered on a size between 0.1 and 0.3 μm and a "second peak" centered on a size between 0.5 μm and 5 μm. Preferably, the two peaks do not overlap, even partially. More preferably, the population of particles having a distribution centered on the first peak represents less than 50% by volume of the whole of the ceramic and metallic particles.

The thermoreversible hydrocolloid is intended to enable gelling, and therefore a great modification of the viscosity of the gellable liquid, under the effect of a decrease in temperature, in a reversible manner. It is therefore likewise suitable for rendering the gel obtained liquefiable under the effect of an increase in temperature, in a reversible manner.

Hydrocolloids suitable for conferring a gelling and liquefaction ability that is reversible under the effect of a decrease and an increase in temperature, respectively, are well known.

Glycols, vinyl alcohols, or acacia gum are not thermoreversible hydrocolloids.

There are certain cellulose gums which display thermoreversible behavior, for example methyl cellulose, but this behavior is the inverse of that of the thermoreversible hydrocolloids employed according to the invention since these gums confer properties of gelling under the effect of an increase in the temperature and of liquefaction under the effect of a decrease in the temperature.

The amount of thermoreversible hydrocolloid is preferably greater than 0.4%, preferably greater than 0.5%, preferably greater than 0.7%, and/or preferably less than 9%, preferably less than 7%, preferably less than 5%, preferably less than 4%, preferably less than 3%, as percentage by mass based on the sum of the mass of the ceramic particles and of the mass of the metallic particles.

Preferably, the thermoreversible hydrocolloid is chosen such that the gelling temperature of the gellable liquid is greater then 20° C., preferably greater than 25° C., preferably greater than 30° C., and preferably less than 60° C., preferably less than 50° C., preferably less than 45° C., preferably less than 40° C.

The thermoreversible hydrocolloid is preferably:

a gelatin, or agar, or a mixture of carrageenan and of a compound providing sodium cations and/or potassium cations and/or calcium cations, or a mixture of furcellaria and of a sugar, or a mixture of konjac gum and of xanthan gum, preferably in a mass ratio of greater than 0.8 and less than 1.2, or a mixture of locust bean gum and of xanthan gum, preferably in a mass ratio of greater than 0.67 and less than 1.5, or a mixture of chitosan and of pectin, preferably having a mass ratio of the amount of pectin to the amount of pectin and of chitosan of greater than 0.2 and less than 0.8, preferably less than 0.5.

Preferably, the thermoreversible hydrocolloid is chosen from a gelatin and a mixture of chitosan and of pectin, preferably having a mass ratio of the amount of pectin to the amount of pectin and of chitosan of greater than 0.2 and less than 0.8, preferably less than 0.5. Preferably, the thermoreversible hydrocolloid is a gelatin.

The dissolution of the thermoreversible hydrocolloid in water can be carried out by any technique known to the person skilled in the art, in particular by mixing, preferably gentle mechanical mixing.

The "other constituents" do not participate in the gellable property of the gellable liquid, that is to say in its ability to gel. In other words, they are not constituents of the thermoreversible hydrocolloid. For example, if the thermoreversible hydrocolloid is a mixture of locust bean gum and of xanthan gum, neither the locust bean gum nor the xanthan gum are considered to be "other constituents". Similarly, for example, if the thermoreversible hydrocolloid is a mixture of chitosan and of pectin, neither the chitosan nor the pectin are considered to be "other constituents".

When the thermoreversible hydrocolloid comprises chitosan, the pH of the gellable liquid is preferably lower than the opposite of the logarithm, in base 10, of the acid dissociation constant, pKa, of the chitosan in water.

Preferably, the "other constituent(s)" are organic.

The amount of other constituent(s) is preferably greater than 0.1%, preferably greater than 0.5% and/or preferably less than 6%, preferably less than 5%, as percentage by mass based on the sum of the mass of the ceramic particles and of the mass of the metallic particles.

The amount of the other constituents should be limited to prevent them from significantly impacting the behavior of the liquefiable gel. The other constituents may in particular have an effect on the liquefaction temperature of the liquefiable gel, as a function of their amount relative to that of the thermoreversible hydrocolloid, but also on the mechanical properties, in particular the modulus of rupture, of the ceramic matrix component.

Preferably, in the gellable liquid, the ratio of the amount by mass of the "other constituents" to the amount by mass of thermoreversible hydrocolloid is less than 1, preferably less than 0.9, preferably less than 0.8, preferably less than 0.6, preferably less than 0.4, the amounts of thermoreversible hydrocolloid and of the "other constituents" being expressed as percentage by mass based on the total mass of the ceramic particles and of the metallic particles.

In particular, preferably, in the gellable liquid, the ratio of the amount by mass of plasticizer of the liquefiable gel, preferably of polyol, to the amount by mass of thermoreversible hydrocolloid is less than 1, preferably less than 0.9, preferably less than 0.8, preferably less than 0.6, preferably less than 0.4, the amounts of thermoreversible hydrocolloid and of plasticizer being expressed as percentage by mass based on the total mass of the ceramic particles and of the metallic particles. Advantageously, the mechanical properties, in particular the modulus of rupture, of the ceramic matrix component are improved.

The presence of organic constituents often requires special precautions to be taken, in particular for extracting the vapors that they emit, to limit the risk of fire and/or of explosion, to avoid dispersing them during transfers, to make storage of them safe, etc. A reduced content of other, preferably organic, constituents is thus particularly advantageous, especially as it simplifies the removal thereof, in particular during debinding.

Preferably, in the gellable liquid, the total content of thermoreversible hydrocolloid and of organic "other constituents", preferably the total content of thermoreversible hydrocolloid and of "other constituents", is less than 15%, preferably less than 10%, preferably less than 7%, preferably less than 5%, as percentage by mass based on the total mass of the ceramic particles and of the metallic particles of the gellable liquid.

Preferably, said "other constituent(s)" are chosen from dispersants, binders, biocidal agents, antifoam agents, thickeners, plasticizers, drying regulators and mixtures thereof.

Preferably, the gellable liquid contains a binder, preferably chosen from polyethylene glycols, polyvinyl alcohols and mixtures thereof, preferably in an amount of greater than 0.5%, preferably greater than 1% and/or less than 3%, preferably less than 2.5%, as percentage by mass based on the sum of the mass of the ceramic particles and of the mass of the metallic particles.

Preferably, the gellable liquid contains a biocidal agent, preferably in an amount of greater than 0.1% and/or less than 1%, preferably less than 0.5%, as percentage by mass based on the sum of the mass of the ceramic particles and of the mass of the metallic particles. PREVENTOL® P301, sold by Lanxess, is an example of a known biocidal agent.

The gellable liquid may contain a dispersant, preferably chosen from an ammonium polyacrylate, a sodium polyacrylate, a modified polycarboxylate ether, a sodium salt of condensation products of naphthalenesulfonic acid, an ammonium polymethacrylate solution, and mixtures thereof, preferably in an amount of greater than 0.1%, preferably greater than 0.2% and/or less than 1%, preferably less than 0.5%, as percentage by mass based on the sum of the mass of the ceramic particles and of the mass of the metallic particles. The products of the Darvan® range sold Vanderbilt Minerals are examples of well-known dispersants.

The gellable liquid may contain an antifoam agent, preferably in an amount of greater than 0.01%, preferably greater than 0.02% and/or less than 1%, preferably less than 0.5%, as percentage by mass based on the sum of the mass of the ceramic particles and of the mass of the metallic particles. The antifoams of the CONTRASPUM range sold by Zschimmer & Schwarz are well known.

The gellable liquid may contain a thickener, preferably in an amount of greater than 0.1%, preferably greater than 0.2% and/or less than 2%, preferably less than 1%, as percentage by mass based on the sum of the mass of the ceramic particles and of the mass of the metallic particles. ACRONAL® S 790 sold by BASF is a well-known thickener.

The gellable liquid may contain a plasticizer for the liquefiable gel, preferably a polyol, preferably in an amount of greater than 0.01%, preferably greater than 0.02% and/or less than 5%, preferably less than 4%, as percentage by mass based on the sum of the mass of the ceramic particles and of the mass of the metallic particles.

The gellable liquid may contain a drying regulator, preferably in an amount of greater than 0.1% and/or less than 2%, as percentage by mass based on the sum of the mass of the ceramic particles and of the mass of the metallic particles. A cyclohexane, dimethyl phthalate, diphenyl phthalate, diethyl phthalate, and triethanolamine are well-known drying regulators.

In one embodiment, in particular when a precursor of ceramic particles in colloidal form is used, the pH of the gellable liquid may be adjusted, for example by adding a base or an acid, so as to improve deflocculation.

When a precursor of ceramic particles in colloidal form is used, it is preferably added to the water, with the thermoreversible hydrocolloid, before the other constituents of the gellable liquid.

In the gellable liquid, the water content by volume is preferably greater than 40%, preferably greater than 50%, and/or preferably less than 70%, preferably less than 60%.

Preferably, the water is demineralized water.

In a preferred embodiment, the thermoreversible hydrocolloid is a gelatin, in an amount of preferably greater than 0.5%, preferably greater than 1%, and preferably less than 9%, preferably less than 7%, preferably less than 5%, preferably less than 4%, preferably less than 3%, preferably less than 2.5%, preferably less than 2%, as percentage by mass based on the sum of the mass of the ceramic particles and of the mass of metallic particles, and the water into which the thermoreversible hydrocolloid is introduced is preferably brought to a temperature of greater than 60° C., preferably greater than 65° C. and preferably less than 75° C., preferably less than 70° C.

In one embodiment, the thermoreversible hydrocolloid is a mixture of chitosan and of pectin, preferably having a mass ratio of the amount of pectin to the amount of pectin and of chitosan of greater than 0.2 and less than 0.8, preferably less than 0.5, in an amount of preferably greater than 0.4%, preferably greater than 0.5%, and preferably less than 9%, preferably less than 7%, preferably less than 5%, preferably less than 4%, preferably less than 3%, preferably less than 2.5%, preferably less than 2%, as percentage by mass based on the sum of the mass of the ceramic particles and of the mass of metallic particles, and the water into which the thermoreversible hydrocolloid is introduced is at a temperature of greater than 50° C., preferably greater than 55° C. and preferably less than 65° C., preferably less than 60° C.

In a preferred embodiment, a hydrocolloid solution is first prepared by dissolving the thermoreversible hydrocolloid in water, the hydrocolloid solution being at a temperature greater than its gelling temperature. The thermoreversible hydrocolloid solution is then mixed with the other constituents of the gellable liquid.

Preferably, the thermoreversible hydrocolloid is chosen such that the gelling temperature of the thermoreversible hydrocolloid solution is greater than 20° C., preferably greater than 25° C., preferably greater than 30° C., and preferably less than 60° C., preferably less than 50° C., preferably less than 45° C., preferably less than 40° C. The person skilled in the art knows how to determine, by simple routine tests and depending on the thermoreversible hydrocolloid, the gelling temperature of the hydrocolloid solution.

In step 2), the gellable liquid is applied to the ceramic fibers of the support.

Preferably, the ceramic fibers, optionally assembled in the form of yarns, represent more than 90%, more than 95%, preferably 100% of the mass of the support.

Preferably, more than 50%, 70%, 90% by number of the ceramic fibers, preferably 100% of the ceramic fibers, optionally assembled in the form of yarns, have:

a length of greater than 10 mm; and an equivalent diameter, measured at half-length, of greater than 2 μm, preferably greater than 4 μm, preferably greater than 6 μm and/or preferably less than 50 μm, preferably less than 30 μm, preferably less than 20 μm.

The ceramic fibers may include a size ("sizing") and/or the ceramic yarns may have an organic surface coating ("finishing"); said size and/or said coating can be removed, at least partially, by chemical and/or thermal means before application of the gellable liquid, said size conventionally representing less than 1% of the mass of the ceramic fiber that it at least partially covers, and said coating conventionally representing less than 4% of the mass of the ceramic yarn that it at least partially covers.

Preferably, the ceramic fibers, optionally assembled in the form of yarns, consist for more than 90%, preferably for more than 95%, preferably for more than 99%, preferably for substantially 100% of their mass of oxide(s) and/or of nitride(s) and/or of carbide(s) and/or of boride(s) and/or of carbon, preferably of oxide(s) and/or of carbide(s) and/or of carbon, preferably of an oxide chosen from $Al_2O_3$, $SiO_2$, $ZrO_2$, $Y_2O_3$, CaO, MgO, an iron oxide, rare earth oxides, $TiO_2$, $Na_2O$, $Cr_2O_3$ and mixtures thereof, or of SiC.

More preferably, the ceramic fibers, optionally assembled in the form of yarns, consist of oxide(s) for more than 90%, preferably for more than 95%, preferably for more than 99%, preferably for substantially 100% of their mass.

Preferably, the ceramic fibers, optionally assembled in the form of yarns, consist of oxide(s) for more than 90%, preferably for more than 95%, preferably for more than 99%, preferably for substantially 100% of their mass, and exhibit a chemical analysis such that $Al_2O_3+SiO_2+ZrO_2+Y_2O_3+CaO+MgO+Fe_2O+$rare earth oxides$+TiO_2+Na_2O+Cr_2O_3{\geq}90\%$, preferably ${\geq}95\%$, preferably ${\geq}99\%$, preferably is substantially equal to 100%, as percentage by weight based on the oxides.

More preferably, the ceramic fibers, optionally assembled in the form of yarns, consist of oxide(s) for more than 90%, preferably for more than 95%, preferably for more than 99%, preferably for substantially 100% of their mass, and exhibit a chemical analysis such that $Al_2O_3+SiO_2{\geq}90\%$, preferably ${\geq}95\%$, preferably ${\geq}99\%$, preferably is substantially equal to 100%, as percentage by mass based on the oxides. Preferably, the ceramic fibers, optionally assembled in the form of yarns, are chosen from glass fibers, amorphous silica fibers, corundum fibers, mullite fibers, mullite-corundum fibers and mixtures thereof.

In one embodiment, the ceramic fibers, optionally assembled in the form of yarns, consist of oxide(s) for more than 90%, preferably for more than 95%, preferably for more than 99%, preferably for substantially 100% of their mass, and exhibit a chemical analysis such that $SiO_2{\geq}90\%$, preferably ${\geq}95\%$, preferably ${\geq}99\%$, as percentage by mass based on the oxides. Preferably, in this embodiment, the ceramic fibers, optionally assembled in the form of yarns, are chosen from glass fibers, amorphous silica fibers and mixtures thereof.

In one embodiment, the ceramic fibers, optionally assembled in the form of yarns, consist of oxide(s) for more than 90%, preferably for more than 95%, preferably for more than 99%, preferably for substantially 100% of their mass, and exhibit a chemical analysis such that $Al_2O_3{\geq}90\%$, preferably ${\geq}95\%$, preferably ${\geq}99\%$, as percentage by mass based on the oxides. Preferably, in this embodiment, the ceramic fibers, optionally assembled in the form of yarns, are corundum fibers.

In one embodiment, the ceramic fibers, optionally assembled in the form of yarns, consist of oxide(s) for more than 90%, preferably for more than 95%, preferably for more than 99%, preferably for substantially 100% of their mass, and exhibit a chemical analysis such that $Al_2O_3{\geq}50\%$, preferably ${\geq}60\%$, preferably ${\geq}70\%$ and ${\geq}90\%$, as percentage by mass based on the oxides. Preferably, in this embodiment, the ceramic fibers, optionally assembled in the form of yarns, are chosen from mullite fibers, mullite-corundum fibers and mixtures thereof.

The material of the ceramic particles in the material of the ceramic fibers, optionally in the form of yarns, may be identical or different.

Preferably, the ceramic fibers, optionally assembled in the form of yarns, are chosen from glass fibers, amorphous silica fibers, corundum fibers, mullite fibers, mullite-corundum fibers and mixtures thereof, and the ceramic particles consist of oxide(s) for more than 90%, preferably for more than 95%, preferably for more than 99%, preferably for substantially 100% of their mass, and exhibit a chemical analysis such that $Al_2O_3+SiO_2{\geq}90\%$, preferably ${\geq}95\%$, preferably ${\geq}99\%$, as percentage by mass based on the oxides. Preferably, this sum of oxide contents is substantially equal to 100%, as percentage by mass based on the oxides.

The support can take the form of a web, preferably in the form of a fabric having weft yarns and warp yarns, a knit or a braid, or the form of a felt in the form of a layer.

The web, preferably the fabric, may in particular have a thickness of less than 5 mm or 2 mm or 1 mm. It may consist of a set of ceramic yarns oriented in a random or ordered manner, for example parallel to one another. It may consist of a set of ceramic fibers or of ceramic yarns that are entangled or oriented in a preferential manner, for example in a plane or parallel to a given direction or to a plurality of favored orientation directions.

Preferably, the web consists of ceramic yarns consisting of assembled ceramic fibers, preferably ceramic fibers having one or more of the features of the fibers described above. Such a ceramic yarn typically comprises several hundred to several thousand ceramic fibers.

At least one yarn, preferably more than 90% by number of the ceramic yarns, preferably each ceramic yarn of a web, preferably has/have a length of greater than 10 mm, 5 cm, 10 cm, 30 cm, or 1 m, and/or preferably less than 10 000 m, 5000 m, 1000 m, 100 m, 50 m or 10 m.

In one embodiment, the support consists of a single web. In one embodiment, the support may consist of a plurality of webs, preferably of more than 2 webs and/or preferably less than 10 webs, preferably less than 8 webs, of identical or different structures, superposed one on top of the other. Preferably, each web consists of said yarns.

In one embodiment, the support comprises a lower, preferably nonwoven, web and an upper, preferably nonwoven, web extending above the lower web, each lower and upper web comprising a plurality of yarns, preferably of said yarns, oriented parallel to the directions of the lower and upper web, respectively, the directions of the lower and upper web forming between them an angle of preferably greater than 15°, 30°, 50°, for example of approximately 90°.

In one embodiment, the support is in the form of a single yarn, that is to say one not assembled with other yarns.

In one embodiment, in particular when the support is an amorphous silica yarn, the ceramic particles are chosen so as to have an $Na_2O+K_2O$ content of preferably less than 0.5%, preferably less than 0.1%, and/or the other constituents, in particular the dispersants, substantially do not contain sodium and/or potassium.

The application of the gellable liquid to the ceramic fibers of the support may be carried out by impregnation, in particular when the support is in the form of a web or of a superposition of webs. Impregnation is also possible when the support is in the form of a yarn. The gellable liquid then penetrates within the support.

The impregnation may be carried out according to any technique known to the person skilled in the art, in particular by doctoring (or "doctor blade" process), by tape casting process, by immersion (for example according to the dip coating process), by gun, by brush or by screen printing.

When the support comprises a number of superposed webs, each web may be impregnated before being superposed on the others. Alternatively, the webs may be superposed one on top of the other without having been impregnated, all the superposed webs then being impregnated simultaneously. Preferably, when the support comprises a number of superposed webs, each web is impregnated before being superposed on the others.

The gellable liquid may also be applied to the ceramic fibers of the support without the gellable liquid penetrating into the bulk of the support. In particular, the gellable liquid may be applied only to the surface of a support in ceramic yarn form.

Preferably, during the application of the gellable liquid, the support is maintained at a temperature greater than the gelling temperature of the gellable liquid, preferably at a temperature more than 5° C., 10° C. or 20° C. greater than the gelling temperature of the gellable liquid. To this end, the support may for example be disposed on a heated plate, in a heated mold or be heated with the aid of a radiant heater.

The gellable liquid impregnates all or some of the fibrous support.

Preferably, the support is a single yarn, a web of yarns, a braid of yarns, a knit of yarns or an entanglement of fibers; said yarn or more than 50%, preferably more than 60%, preferably more than 70%, preferably more than 80%, preferably more than 90%, preferably more than 95%, preferably 100% of the yarns or of the fibers, as percentage by number, is/are preferably coated, for more than 20%, preferably more than 50%, preferably more than 60%, preferably more than 70%, more than 80%, more than 90%, more than 95%, preferably 100% of their outer surfaces, with gellable liquid.

In step 3), the gellable liquid is cooled to a temperature lower than its gelling temperature so as to transform it into a liquefiable gel, preferably to a temperature more than 5° C., 10° C. or 20° C. lower than the gelling temperature of the gellable liquid.

The temperature and the duration of step 3) are preferably adapted so that more than 90%, more than 95%, preferably 100%, as percentage by mass, of the gellable liquid gels.

A prepreg according to the invention is thus obtained.

The gelling temperature depends on the hydrocolloid. Preferably, it is greater than 20° C., preferably greater than 25° C., preferably greater than 30° C., and preferably less than 60° C., preferably less than 50° C., preferably less than 45° C., preferably less than 40° C.

Preferably, simple cooling to ambient temperature makes it possible to gel the gellable liquid. In this case, the prepreg may be stored at ambient temperature without the liquefiable gel liquefying.

The cooling may also be effected in a refrigerated cell, so as to accelerate the gelling.

This does not lead to a modification of the composition. The composition of the liquefiable gel is thus identical to the composition of the gellable liquid.

Preferably, the prepreg is dry to the touch.

In step 4), which is optional, the prepreg according to the invention is stored.

Preferably, the prepreg is stored and/or placed in a hermetic bag less than 1 month, preferably less than 15 days, preferably less than 5 days, preferably less than 1 day after step 3). Preferably, between the end of step 3) and step 4) it does not undergo any drying other than by natural evaporation. In particular, it does not undergo any drying by heating. Preferably, the water content by volume of the prepreg at the moment at which it is stored or packaged in the hermetic bag is greater than 95%, preferably greater than 98%, preferably substantially equal to 100% of the water content by volume at the end of step 3). Advantageously, the additions of water required to manufacture the ceramic matrix component are thus limited, or even zero.

The prepreg may be stored for example for more than 1 month, 2 months, 3 months, 6 months or 1 year and/or preferably less than 5 years.

The gelled form advantageously makes it possible to immobilize the liquefiable gel in relation to the support, and in particular to prevent it flowing between the ceramic fibers of the support or along the support. In addition, the gelled form advantageously makes it possible to immobilize the ceramic particles and the optional constituents, in particular the optional metallic particles, with respect to the water. The spatial distribution of the ceramic particles and of the optional constituents thus remains homogeneous, which subsequently results in a ceramic matrix component, in particular a CMC, also having homogeneous properties.

The amount of thermoreversible hydrocolloid in the gellable liquid in step 1) is adapted depending on the desired storage period and the desired gel strength. Simple tests can be used to evaluate the gelling power of a thermoreversible hydrocolloid and its ability to be correctly maintained on the support during the desired storage period.

For example, in the case where the gellable liquid comprises a gelatin, if the liquefiable gel formed is not strong enough, the amount of gelatin may be increased and/or a gelatin with a higher Bloom value may be used.

The following test may be used to evaluate the ability of a gellable liquid to form a liquefiable gel. 50 ml of the gellable liquid are placed in a plastic beaker having a diameter equal to 50 mm and a height equal to 50 mm. The beaker is placed in a cooling cell at a temperature lower than the gelling temperature of the gellable liquid for a time sufficient to gel all of the gellable liquid. The beaker is then removed from the cell and inverted. In one embodiment, if there has been no flow of the liquefiable gel after one minute, the gellable liquid is considered satisfactory. Otherwise, as described above, the amount of thermoreversible hydrocolloid is increased and/or the thermoreversible hydrocolloid is replaced with a thermoreversible hydrocolloid which produces a stronger gel.

If multiple prepregs are stored together, preference is given to placing an interlayer made of a material preventing any bonding between the different prepregs, for example made of a polymer. For example, a film made of polyester or of polyethylene or of polyethylene terephthalate, for example made of Mylar, may be arranged in order to separate stacked prepregs.

Preferably, such an interlayer is also interposed between each web of a given prepreg, or between two layers of a given prepreg which, without this interlayer, would be in contact, in particular if the prepreg is folded over on itself or rolled up on itself in the form of a roll.

Before being stored, each prepreg or set of prepregs is preferably placed in a hermetic bag which advantageously limits the degradation thereof over time, in particular as a result of drying out.

Advantageously, a prepreg according to the invention may be stored at ambient temperature for a long period, substantially without degradation.

In a preferred embodiment, the method according to the invention for manufacturing a prepreg has the following preferences:

in step 1), the gellable liquid consists of:

ceramic particles, in an amount of greater than 25% and less than 55%, as percentage by volume based on the volume of the gellable liquid, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles;

the whole of said ceramic particles exhibiting, by volume, a median size $D_{50}$ of less than 5 μm and greater than 0.1 μm, and a 99 percentile, $D_{99}$, of less than 50 μm; and a thermoreversible hydrocolloid, in an amount of greater than 0.4% and less than 9%, as percentage by mass based on the ceramic particles;

said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and other organic constituents, in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof; the remainder to 100% being water; and in step 2):

more than 90% by number of the ceramic fibers of the support, optionally assembled in the form of yarns, have:

a length of greater than 10 mm; and an equivalent diameter, measured at half-length, of greater than 2 μm and less than 50 μm; and the ceramic fibers, optionally assembled in the form of yarns, represent more than 90% of the mass of the support, said fibers, optionally assembled in the form of yarns, consisting for more than 90% of their mass of oxide(s) and/or of nitride(s) and/or of carbide(s) and/or of boride(s) and/or of carbon; and the support is a single yarn, a web of yarns, a braid of yarns, a knit of yarns or an entanglement of fibers, and said yarn or more than 50% of the yarns or of the fibers, as percentage by number, is/are coated, for more than 50% of their outer surfaces, with gellable liquid; and in step 3):

the temperature and the duration of said step 3) are adapted so that more than 90% of the gellable liquid, as percentage by mass, gels; the gellable liquid being chosen so as to have a gelling temperature of greater than 20° C.

In this preferred embodiment, the gellable liquid does not comprise metallic particles or precursors of such particles.

In one embodiment, the method according to the invention for manufacturing a prepreg has the following preferences:

in step 1), the gellable liquid consists of:

ceramic particles, in an amount of greater than 25% and less than 55%, as percentage by volume based on the volume of the gellable liquid, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles, the whole of said ceramic particles exhibiting, by volume, a median size $D_{50}$ of less than 5 μm and greater than 0.1 μm, and a 99 percentile, $D_{99}$, of less than 50 μm; and metallic particles, in an amount of greater than 0.5% and less than 9%, as percentage by volume based on the volume of the gellable liquid, the whole of said ceramic and metallic particles exhibiting, by volume, a median size $D_{50}$ of less than 5 μm and greater than 0.1 μm, and a 99 percentile, $D_{99}$, of less than 50 μm; and a thermoreversible hydrocolloid, in an amount of greater than 0.4% and less than 9%, as percentage by mass based on the sum of the mass of the ceramic particles and of the mass of the metallic particles, said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and other organic constituents, in an amount of greater than 0.1% and less than 6%, as percentage by mass based on the sum of the mass of the ceramic particles and of the mass of the metallic particles, said other organic constituents being chosen from dispersants, binders, biocidal agents, antifoam agents, thickeners, plasticizers, drying regulators and mixtures thereof; the remainder to 100% being water; and in step 2):

more than 90% by number of the ceramic fibers of the support, optionally assembled in the form of yarns, have:

a length of greater than 10 mm; and an equivalent diameter, measured at half-length, of greater than 2 μm and less than 50 μm; and the ceramic fibers, optionally assembled in the form of yarns, represent more than 90% of the mass of the support, said fibers, optionally assembled in the form of yarns, consisting for more than 90% of their mass of oxide(s) and/or of nitride(s) and/or of carbide(s) and/or of boride(s) and/or of carbon; and the support is a single yarn, a web of yarns, a braid of yarns, a knit of yarns or an entanglement of fibers, and said yarn or more than 50% of the yarns or of the fibers, as percentage by number, is/are coated, for more than 50% of their outer surfaces, with gellable liquid; and in step 3):

the temperature and the duration of said step 3) are adapted so that more than 90% of the gellable liquid, as percentage by mass, gels; the gellable liquid being chosen so as to have a gelling temperature of greater than 20° C.

In a preferred embodiment, the method according to the invention for manufacturing a prepreg has the following preferences:

in step 1), the gellable liquid consists of:

ceramic particles, in an amount of greater than 30% and less than 50%, as percentage by volume based on the volume of the gellable liquid;

more than 95% by volume of the ceramic particles consisting of oxide(s) for more than 99% of their mass, and exhibiting a chemical analysis such that $Al_2O_3+SiO_2 \geq 95\%$, as percentage by mass based on the oxides; the whole of the ceramic particles exhibiting, by volume, a median size Do of less than 5 μm and greater than 0.1 μm, and a 99 percentile, $D_{99}$, of less than 50 μm; and a thermoreversible hydrocolloid, in an amount of greater than 0.5% and less than 4%, as percentage by mass based on the mass of the ceramic particles, said thermoreversible hydrocolloid being a gelatin; and other organic constituents, in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof; the remainder to 100% being water; and in step 2):

more than 90% by number of the ceramic fibers of the support, optionally assembled in the form of yarns, have:

a length of greater than 10 mm; and an equivalent diameter, measured at half-length, of greater than 2 μm and less than 30 μm; and the ceramic fibers, optionally assembled in the form of yarns, represent more than 90% of the mass of the support, said fibers, optionally assembled in the form of yarns, consisting of oxide(s) for more than 95% of their mass and exhibiting a chemical analysis such that $Al_2O_3+SiO_2 \geq 95\%$, as percentage by mass based on the oxides; and the support is a single yarn, a web of yarns, a braid of yarns, a knit of yarns or an entanglement of fibers, and said yarn or more than 50% of the yarns or of the fibers, as percentage by number, is/are coated, for more than 50% of their outer surfaces, with gellable liquid; and in step 3):

the temperature and the duration of said step 3) are preferably adapted so that more than 90% of the gellable liquid, as percentage by mass, gels; the gellable liquid being chosen so as to have a gelling temperature of greater than 20° C.

This preferred embodiment does not comprise metallic particles or precursors of such particles.

Preferably, the prepreg according to the invention is manufactured according to a manufacturing method according to the invention.

Method for Manufacturing a Ceramic Matrix Component

A method for manufacturing a ceramic matrix component according to the invention comprises steps 5) to 9) described above, steps 7) and 9) being optional.

In step 5), at least one prepreg according to the invention, preferably manufactured according to the preceding steps, is removed from its bag, where appropriate, and then, optionally after a first partial shaping, is heated so that temperature of at least a portion, preferably of all the liquefiable gel, reaches and preferably exceeds the liquefaction temperature of the liquefiable gel.

In one embodiment, multiple prepregs according to the invention are simultaneously heated so that the temperature of at least a portion, preferably of all the liquefiable gel, reaches and preferably exceeds the liquefaction temperature of the liquefiable gel, for example after having been superposed one on top of the other.

The heating is preferably carried out at less than 80° C., preferably at less than 70° C., preferably at less than 60° C., preferably at less than 50° C.

A prepreg in the form of a yarn may take the form of a spool of yarn. The yarn may be heated only locally, to the extent necessary for its unwinding.

The prepreg then becomes readily deformable, like the prepregs of the prior art.

Remarkably, temporary storage of the prepreg at ambient temperature, before it is heated, does not significantly degrade it. Preferably, however, the temporary storage lasts less than 48 h, preferably less than 24 h.

In one embodiment, the prepreg may be wetted before step 6).

The high water content in the prepreg advantageously makes it possible to limit additions of water, which simplifies manufacture. In addition, the water in the prepreg is advantageously distributed more uniformly within the prepreg than any water that may be added to wet it. The mechanical properties of the ceramic matrix component are improved thereby.

Preferably, the additions of water resulting from this wetting are less than 20%, preferably less than 10%, preferably less than 5%, of the water content by volume of the liquefiable gel of the prepreg.

Preferably, the prepreg is not wetted.

In step 6), the prepreg rendered deformable in the preceding step is shaped according to the desired geometry, according to any technique known to the person skilled in the art, so as to obtain a deformable preform.

Preferably, the prepreg is shaped by being pressed on a mold.

A plurality of prepregs rendered deformable in the preceding step, preferably more than 2 and preferably less than 10 prepregs, may be shaped in step 6). Preferably, each prepreg takes the form of a web or multiple superposed webs.

Conventionally, a plurality of prepregs prepared in step 5) are shaped simultaneously, for example after having been superposed one on top of the other, or are successively applied to a mould, in superposition. The shaping may in particular comprise stacking a plurality of prepregs followed by lamination or stacking a plurality of prepregs followed by autoclaving, in particular when the prepregs take the form of a web or of multiple superposed webs.

The shaping of a prepreg in the form of a yarn may also result from localized heating of the prepreg followed by winding.

A prepreg in the form of a yarn may in particular be wound around a base, temporarily or otherwise, for example around a mandrel, for example having a circular, oval or polyhedral cross section. This operation is referred to as filament winding.

The base may be temporary or permanent, depending on whether or not it is subsequently separated from the wound yarn. The number of turns around the base may be greater than 5, 50, 500, 5000 and/or preferably less than 1 000 000 or 100 000. In one embodiment, the winding of the yarn gives the latter a tubular shape. In one embodiment, said tubular shape may be cut, for example along a generatrix, and, for example, opened out so as to obtain a planar shape.

The shaping of a prepreg in the form of a yarn may alternatively result from localized heating of the prepreg, deposition on a surface, and then application of pressure, the deposition and/or the application of pressure possibly being simultaneous with the heating.

A prepreg in the form of a yarn may in particular be unwound on a surface that is not closed on itself, for example a planar surface. This operation is referred to as filament placement. It may be implemented by means of a 3D printer. The unwound yarn may go back and forth over the surface, like the furrows traced by a plow, with or without overlap (juxtaposition). In one embodiment, the placement of the yarn results in a planar shape.

Steps 5) and 6) may be simultaneous, as described in particular in the example below.

In step 7), which is an optional step, the deformable preform resulting from the preceding step, consisting of one or more prepregs according to the invention, is cooled so that the temperature of at least a portion, preferably of all the gellable liquid, reaches and preferably falls below the gelling temperature of the gellable liquid.

The deformable preform stiffens and becomes a "stiffened" preform, which advantageously facilitates the handling thereof.

Of course, the stiffened preform can retain some deformability. However, this deformability is less than that of the deformable preform.

Preferably, the method does not include step 7).

In step 8), the deformable (i.e. in the absence of step 7)) or stiffened (i.e. with a step 7)) preform is dried. Any technique known to the person skilled in the art may be used.

Preferably, if a step 7) has been performed, the drying is carried out at a drying temperature less than the liquefaction temperature of the liquefiable gel, for example drying under vacuum. The stiffened preform thus remains stiff.

Preferably, if no step 7) has been performed, the drying is carried out at a temperature greater than the gelling temperature of the gellable liquid.

The drying removes at least some of the water, which stiffens the deformable preform without a specific step of gelling the gellable liquid.

When the thermoreversible hydrocolloid is a gelatin, drying at a temperature equal to 50° C. and at a relative humidity equal to 30% for a period of preferably between 0.5 hours and 12 hours is well suited.

The drying results in a ceramic matrix component.

In step 9), which is optional and preferred, the ceramic matrix component resulting from the preceding step is sintered. The ceramic matrix component is then a CMC.

The person skilled in the art knows how to determine the sintering conditions depending on the nature of the ceramic particles, the optional metallic particles and the ceramic fibers.

In particular when the ceramic fibers are made of an oxide and when the ceramic particles exhibit a chemical analysis such that $SiO_2 \geq 90\%$, the sintering temperature is preferably greater than 800° C. and preferably less than 1000° C., the sintering taking place preferably under air and preferably at a pressure of 1 bar, the stationary phase hold time preferably being greater than 1 hour and preferably less than 10 hours.

In particular when the ceramic fibers are made of an oxide and when the ceramic particles exhibit a chemical analysis such that $Al_2O_3 \geq 90\%$, the sintering temperature is preferably greater than 1000° C. and preferably less than 1300° C., the sintering taking place preferably under air and preferably at a pressure of 1 bar, the stationary phase hold time preferably being greater than 1 hour and preferably less than 10 hours.

In particular when the ceramic fibers are made of a carbide and/or a boride and/or a nitride and/or of carbon and the ceramic particles are made of a carbide and/or a boride and/or a nitride and/or of carbon, the sintering temperature is preferably greater than 1400° C. and preferably less than 2300° C., the sintering taking place preferably under a neutral, reducing or reactive atmosphere, preferably at a pressure of 1 bar, the stationary phase hold time preferably being greater than 1 hour and preferably less than 10 hours.

The CMC may in particular be used in the following applications: hot gas exhaust component, baking support, thermal insulation, hot drive rollers for hot glass components.

However, a prepreg according to the invention is not limited to the manufacture of a CMC and may for example be used to manufacture other ceramic matrix components, in particular a heat shield, in particular a conformable heat shield, i.e. one that can adapt to the shape of the object to be protected from heat.

Prepreg

The features, and in particular the preferred features, of a prepreg according to the invention emerge directly from the preceding description of the method.

In particular, the amounts, and in particular the preferred amounts, the compositions, and in particular the preferred compositions, the median sizes, and in particular the preferred median sizes, the 99 percentiles ($D_9$), and in particular the preferred 99 percentiles, the particle size distributions, and in particular the preferred particle size distributions, of the ceramic particles, of the metallic particles, of the precursors of ceramic particles and of the precursors of metallic particles in the liquefiable gel are identical to those described above for the gellable liquid;

the amounts, and in particular the preferred amounts, the compositions, and in particular the preferred compositions, the gelling temperatures, and in particular the preferred gelling temperatures, of the thermoreversible hydrocolloids of the liquefiable gel are identical to those described above for the gellable liquid;

the amounts, and in particular the preferred amounts, the compositions, and in particular the preferred compositions, of the "other constituents" are identical to those described above for the gellable liquid;

the amounts, and in particular the preferred amounts, the compositions, and in particular the preferred compositions, the dimensions, and in particular the preferred dimensions, of the fibers and of the yarns of the support are identical to those described above for the method for manufacturing the ceramic matrix component;

the outer surface portions of the fibers and of the yarns of the support that are covered with liquefiable gel are identical to those described above for the outer surface portions of the fibers and of the yarns of the support that are covered with gellable liquid;

the shapes, and in particular the preferred shapes, the structures, for example the orientation of the yarns of different superposed webs and also the number of webs, and in particular the preferred structures, the dimensions, and in particular the preferred dimensions, of the support are identical to those described above for the method for manufacturing the ceramic matrix component; the packing of the prepreg, and in particular the addition of interlayers and the packaging, is identical to that described above for the method for manufacturing the ceramic matrix component.

The water of the liquefiable gel is preferably demineralized water.

In a preferred embodiment, the prepreg according to the invention has the following preferences:

the liquefiable gel consists of:

ceramic particles, in an amount of greater than 25% and less than 55%, as percentage by volume based on the volume of the liquefiable gel, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles;

the whole of said ceramic particles exhibiting, by volume, a median size $D_{50}$ of less than 5 μm and greater than 0.1 μm, and a 99 percentile, $D_{99}$, of less than 50 μm; and a thermoreversible hydrocolloid, in an amount of greater than 0.4% and less than 9%, as percentage by mass based on the mass of the ceramic particles;

said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and other organic constituents, in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof;

the remainder to 100% being water; and more than 90% by number of the ceramic fibers of the support, optionally assembled in the form of yarns, have:

a length of greater than 10 mm; and an equivalent diameter, measured at half-length, of greater than 2 μm and less than 50 μm; and the ceramic fibers, optionally assembled in the form of yarns, represent more than 90% of the mass of the support, said fibers, optionally assembled in the form of yarns, consisting for more than 90% of their mass of oxide(s) and/or of nitride(s) and/or of carbide(s) and/or of boride(s) and/or of carbon; and the support is a single yarn, a web of yarns, a braid of yarns, a knit of yarns or an entanglement of fibers, said yarn or more than 50% of the yarns or of the fibers, as percentage by number, is/are coated, for more than 50% of their outer surfaces, with liquefiable gel.

In this preferred embodiment, the liquefiable gel does not comprise metallic particles or precursors of such particles.

In one embodiment, the prepreg according to the invention has the following preferences:

the liquefiable gel consists of:

ceramic particles, in an amount of greater than 25% and less than 55%, as percentage by volume based on the volume of the liquefiable gel, said ceramic particles being chosen from particles consisting of oxide(s) for more than 90% of their mass, particles consisting of nitride(s) for more than 90% of their mass, particles consisting of carbide(s) for more than 90% of their mass, particles consisting of boride(s) for more than 90% of their mass, and mixtures of these particles, the whole of said ceramic particles exhibiting, by volume, a median size $D_{50}$ of less than 5 μm and greater than 0.1 μm, and a 99 percentile, $D_{99}$, of less than 50 μm; and metallic particles, in an amount of greater than 0.5% and less than 9%, as percentage by volume based on the volume of the liquefiable gel, the whole of said ceramic and metallic particles exhibiting, by volume, a median size $D_{50}$ of less than 5 μm and greater than 0.1 μm, and a 99 percentile, $D_{99}$, of less than 50 μm; and a thermoreversible hydrocolloid, in an amount of greater than 0.4% and less than 9%, as percentage by mass based on the sum of the mass of the ceramic particles and of the mass of the metallic particles, said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8, said thermoreversible hydrocolloid preferably being a gelatin; and other organic constituents, in an amount of greater than 0.1% and less than 6%, as percentage by mass based on the sum of the mass of the ceramic particles and of the mass of the metallic particles, said other organic constituents being chosen from dispersants, binders, biocidal agents, antifoam agents, thickeners, plasticizers, drying regulators and mixtures thereof; and the remainder to 100% being water; and more than 90% by number of the ceramic fibers of the support, optionally assembled in the form of yarns, have:

a length of greater than 10 mm; and an equivalent diameter, measured at half-length, of greater than 2 μm and less than 50 μm; and the ceramic fibers, optionally assembled in the form of yarns, represent more than 90% of the mass of the support, said fibers, optionally assembled in the form of yarns, consisting for more than 90% of their mass of oxide(s) and/or of nitride(s) and/or of carbide(s) and/or of boride(s) and/or of carbon; and the support is a single yarn, a web of yarns, a braid of yarns, a knit of yarns or an entanglement of fibers, said yarn or more than 50% of the yarns or of the fibers, as percentage by number, is/are coated, for more than 50% of their outer surfaces, with liquefiable gel.

In a preferred embodiment, the prepreg according to the invention has the following preferences:

the liquefiable gel consists of:

ceramic particles, in an amount of greater than 30% and less than 50%, as percentage by volume based on the volume of the liquefiable gel;

more than 95% by volume of the ceramic particles consisting of oxide(s) for more than 99% of their mass, and exhibiting a chemical analysis such that $Al_2O_3+SiO_2 \geq 95\%$, as percentage by mass based on the oxides;

the whole of the ceramic particles exhibiting, by volume, a median size $D_{50}$ of less than 5 μm and greater than 0.1 μm, and a 99 percentile, $D_{99}$, of less than 50 μm; and a thermoreversible hydrocolloid, in an amount of greater than 0.5% and less than 4%, as percentage by mass based on the mass of the ceramic particles, said thermoreversible hydrocolloid being a gelatin; and other, organic, constituents, in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof; the remainder to 100% being water; and more than 90% by number of the ceramic fibers of the support, optionally assembled in the form of yarns, have:

a length of greater than 10 mm; and an equivalent diameter, measured at half-length, of greater than 2 μm and less than 30 μm; and the ceramic fibers, optionally assembled in the form of yarns, represent more than 90% of the mass of the support, said ceramic fibers, optionally assembled in the form of yarns, consisting of oxide(s) for more than 95% of their mass and exhibiting a chemical analysis such that $Al_2O_3+SiO_2 \geq 95\%$, as percentage by mass based on the oxides; and the support is a single yarn, a web of yarns, a braid of yarns, a knit of yarns or an entanglement of fibers, said yarn or more than 50% of the yarns or of the fibers, as percentage by number, is/are coated, for more than 50% of their outer surfaces, with liquefiable gel.

In this preferred embodiment, the liquefiable gel does not comprise metallic particles or precursors of such particles.

Examples

The following nonlimiting example is given for the purpose of illustrating the invention. Manufacturing Protocol The following starting substances are used:

as thermoreversible hydrocolloid, a gelatin, having a Bloom value equal to 280, passing entirely through a square-mesh sieve with an opening equal to 0.841 mm, sold by Weishardt International, as agent for adjusting the pH, a solution of ammonium hydroxide $NH_4OH$ in water, in a concentration equal to 20% by mass, as precursor of ceramic particles, a solution of colloidal silica, LUDOX AS40, as powder of ceramic particles, an amorphous silica powder having a purity by mass greater than 99.9%, a median size equal to 1.4 μm and a 99 percentile equal to 4 μm, as binder, polyethylene glycol PEG4000 provided in a liquid form having a PEG 4000 concentration equal to 50% by mass, the remainder being water, as fibrous support, a ⅕ satin fabric made of Quartzel® yarns having a basis weight equal to 200 g/m², said yarns bearing the reference C14 80 ZO QS1318 being sold by Saint-Gobain Quartz. Before being used, the fabric underwent a heat treatment in an electric oven for the purpose of desizing the yarns, said heat treatment consisting in an increase to 550° C. at a rate equal to 100° C./min, a stationary phase of 1 hour at 550° C. and a natural temperature descent.

In step 1), 20 g of gelatin are allowed to swell for 5 minutes in 200 g of water at ambient temperature having a resistivity of greater than 17 MΩ·cm, and then the whole is brought to a temperature equal to 65° C. for 5 minutes, in order to allow the gelatin to dissolve completely. The pH is then adjusted to a value equal to 9 by addition of the ammonium hydroxide solution and the temperature of the suspension is then lowered and maintained at a temperature equal to 50° C.

A gellable liquid is then prepared as follows.

170 g of the amorphous silica powder, 75 g of LUDOX AS40, 55 g of water, 4 g of PEG4000, 100 g of a powder of alumina beads having a median size equal to 6 mm and 100 g of a powder of alumina beads having a median size equal to 10 mm are placed in a jar having a volume equal to 0.5 liters. The jar is closed and then set in rotation on ajar mill at a speed of rotation equal to 50 rpm for 12 hours.

The beads are then removed, and the suspension obtained is brought to a temperature equal to 50° C. The gellable liquid intended to impregnate the quartz yarn fabrics is prepared by mixing, with a spatula, said suspension and 33.3 g of the gelatin suspension prepared in step 1). The gellable liquid thus obtained, having the composition described in table 1, is maintained at a temperature of 50° C.

TABLE 1

| | | % |
|---|---|---|
| Ceramic particles | AFMT07 silica powder | 33.87 |
| (as percentage by volume based on | LUDOX AS40 | 5.98 |
| the volume of the gellable liquid) | | |
| Metallic particles (as percentage by volume based on the volume of the gellable liquid) | | 0 |
| Gelatin (as percentage by mass based on the total mass of the ceramic particles and of the metallic particles) | | 1.51 |
| Binder (as percentage by mass based on PEG4000 the total massof the ceramic particles and of the metallic particles) | | 2 |
| Water (as percentage by mass based on the mass of the gellable liquid) | | 39.21 |

In step 2), the satin fabric of Quartzel® yarns, 80 mm×80 mm in size, is laid flat on a glass sheet heated beforehand to a temperature equal to 50° C. The gellable liquid obtained at the end of step 2), still at a temperature equal to 50° C., is poured over said fabric, then spread over said fabric with the aid of a plastic spatula. The fabric is then turned over and gellable liquid is poured over said fabric at a temperature equal to 50° C. and then spread with the aid of a plastic spatula.

A plastic film is placed onto each of the major faces of the impregnated fabric thus obtained. The whole is then closed within a sealed plastic bag. Step 2) is repeated so as to obtain four fabrics of Quartzel® yarns impregnated with the gellable liquid obtained at the end of step 1).

In step 3), the plastic bags are placed in a cell at 6° C. for 12 hours so as to gel the gellable liquid and obtain prepregs according to the invention in the form of four prepregs, said prepregs being stored in said cell pending their use.

In step 4), the plastic bags are removed from the cell and stored at ambient temperature for 180 days.

A CMC is then manufactured from the four prepregs according to the invention according to the following steps.

In step 5), the first prepreg is placed flat on a glass sheet heated beforehand to 50° C. The second prepreg is then placed on the first prepreg, orienting the yarns of said second prepreg at an angle equal to 90° in relation to the yarns of the first prepreg. The two prepregs are smoothed down with the aid of a plastic spatula. The third prepreg is then placed on the second prepreg, the yarns of said third prepreg having the same direction as the yarns of the second prepreg, the third prepreg being turned over, like a pancake, with regard to the second prepreg. The third prepreg is then smoothed down over the set of the first and second prepregs with the aid of a plastic spatula. Lastly, the fourth prepreg is placed on the third prepreg, orienting the yarns of said fourth prepreg with an angle equal to 90° in relation to the yarns of the third prepreg, the fourth prepreg being turned over with regard to the second prepreg. The fourth prepreg is smoothed down over the set of the first, second and third prepregs with the aid of a plastic spatula. A plastic film is placed on each of the major faces of the set of prepregs and then the whole is placed into a hermetic bag. Lastly, the bag is placed in a drying oven 50° C. for 1 hour.

In step 6), the set of prepregs is taken out of the bag and immediately smoothed down with a plastic spatula, so as to obtain a deformable preform. Each of the major faces of the deformable preform is protected with a plastic film.

The prepregs according to the invention have good conformability and good bondability, in particular after a period of storage between manufacture and use.

In step 8), the plastic film is removed on one of the major faces of the deformable preform, and said deformable preform is dried for 12 hours in a drying oven at 50° C. in an atmosphere with 30% relative humidity.

In step 9), the preform resulting from step 8) is sintered in an electric oven according to the following cycle so as to obtain a ceramic matrix composite:

increase from 20° C. to 900° C. at a rate equal to 10° C./min, maintenance at 900° C. for 1 hour, natural descent to ambient temperature.

As is now clearly apparent, the invention provides a prepreg enabling the manufacture of a ceramic matrix component, in particular by drying and/or sintering. This prepreg comprises a gel which adheres effectively to the fiber support and immobilizes the ceramic particles. The gel also makes it possible to trap water, which limits evaporation. Advantageously, the prepreg may be stored for a long period without substantial modification of its structure. It thus remains suitable for the manufacture of a ceramic matrix component, in particular a CMC.

Of course, the invention is not limited to the examples and embodiments described above.

The invention claimed is:

1. A prepreg comprising a support comprising more than 90% by weight of ceramic fibers and a thermoreversible liquefiable gel covering, at least in part, at least a portion of said ceramic fibers, said liquefiable gel comprising:

ceramic particles and/or precursors of ceramic particles able to form, by a heat treatment of said precursors, at a temperature of greater than 200° C., such said ceramic particles, the total amount of the ceramic particles in the liquefiable gel and of the ceramic particles formed by said heat treatment being from 20% to 60%, as percentage by volume based on the volume of the liquefiable gel;

metallic particles and/or precursors of metallic particles able to form, by a heat treatment of said precursors, at a temperature of greater than 200° C., such said metallic particles, the total amount of the metallic particles in the liquefiable gel and of the metallic particles formed by said heat treatment being from 0% to 10%, as percentage by volume based on the volume of the liquefiable gel;

0.2% to 10% of a thermoreversible hydrocolloid, as percentage by mass based on the total mass of the ceramic particles and of the metallic particles;

0% to 7% of one or more other constituents, as percentage by mass based on the total mass of the ceramic particles and of the metallic particles;

the remainder to 100% being water, the water content by volume in the liquefiable gel being greater than 40%; such as to become liquid on heating.

2. The prepreg as claimed in claim 1, in which:

the total amount of the ceramic particles in the liquefiable gel and of the ceramic particles formed by said heat treatment is greater than 25% and less than 55%, as percentage by volume based on the volume of the liquefiable gel, and/or the thermoreversible hydrocolloid is present in an amount of greater than 0.4%, as percentage by mass based on the total mass of the ceramic particles and of the metallic particles.

3. The prepreg as claimed in claim 1, in which:

the ceramic particles of the liquefiable gel and the ceramic particles formed by said heat treatment are chosen from particles comprising more than 90% by weight of oxide(s), particles comprising more than 90% by weight of nitride(s), particles comprising more than 90% by weight of carbide(s), particles comprising more than 90% by weight of boride(s), and mixtures of these particles; and/or the thermoreversible hydrocolloid of the liquefiable gel is chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, and a mixture of chitosan and of pectin, having a mass ratio of the amount of pectin to the amount of pectin and of chitosan of greater than 0.2 and less than 0.8.

4. The prepreg as claimed in claim 3, in which:

more than 90% by volume of the ceramic particles in a set of particles consisting of the ceramic particles of the liquefiable gel and of the ceramic particles formed by said heat treatment comprise more than 90% by weight of oxide(s); and/or the thermoreversible hydrocolloid of the liquefiable gel is chosen from a gelatin, a mixture of chitosan and of pectin, having a mass ratio of the amount of pectin to the amount of pectin and of chitosan of greater than 0.2 and less than 0.8.

5. The prepreg as claimed in claim 4, in which more than 95% by volume of the ceramic particles in said set of particles comprise more than 99% by weight of oxide(s), and exhibit a chemical analysis such that $Al_2O_3+SiO_2 \geq 95\%$, as percentage by mass based on the oxides.

6. The prepreg as claimed in claim 1, in which:
more than 90% by number of the ceramic fibers of the support, optionally assembled in the form of yarns, have a length of greater than 10 mm and an equivalent diameter, measured at half-length, of greater than 2 μm and less than 50 μm; and/or
the ceramic fibers of the support comprise more than 90% by weight of oxide(s) and/or of nitride(s) and/or of carbide(s) and/or of boride(s) and/or of carbon; and/or
the support is a single yarn, a web of yarns, a braid of yarns, a knit of yarns or an entanglement of fibers, said yarn or more than 50% of the yarns or of the ceramic fibers, as percentage by number, is/are coated, for more than 50% of their outer surfaces, with liquefiable gel.

7. The prepreg as claimed in claim 6, in which the ceramic fibers of the support, optionally assembled in the form of yarns, comprise more than 95% by weight of oxide(s), and exhibit a chemical analysis such that $Al_2O_3+SiO_2 \geq 95\%$, as percentage by mass based on the oxides.

8. The prepreg as claimed in claim 7, in which the ceramic fibers of the support, optionally assembled in the form of yarns, are chosen from glass fibers, amorphous silica fibers, corundum fibers, mullite fibers, mullite-corundum fibers and mixtures thereof.

9. The prepreg as claimed in claim 1, in which the support consists of a plurality of superposed webs.

10. The prepreg as claimed in claim 1, in which,
in the liquefiable gel,
the total amount of the ceramic particles in the liquefiable gel and of the ceramic particles formed by said heat treatment is greater than 25% and less than 55%, as percentage by volume based on the volume of the liquefiable gel, the ceramic particles of the liquefiable gel and the ceramic particles formed by said heat treatment being chosen from particles comprising more than 90% by weight oxide(s), particles comprising more than 90% by weight of nitride(s), particles comprising more than 90% by weight of carbide(s), particles comprising more than 90% by weight of boride(s), and mixtures of these particles; the whole of said ceramic particles of the liquefiable gel and said ceramic particles formed by said heat treatment exhibiting, by volume, a median size $D_{50}$ of less than 5 μm and greater than 0.1 μm, and a 99 percentile, $D_{99}$, of less than 50 μm; and
the thermoreversible hydrocolloid is present in an amount of greater than 0.4% and less than 9%, as percentage by mass based on the mass of the ceramic particles, said thermoreversible hydrocolloid being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8; and
the other constituents are organic and present in an amount of greater than 0.1% and less than 6%, as percentage by mass based on the mass of the ceramic particles, said other constituents being chosen from dispersants, binders, biocidal agents, antifoam agents, thickeners, plasticizers, drying regulators and mixtures thereof;
in the support,
more than 90% by number of the ceramic fibers of the support, optionally assembled in the form of yarns, have a length of greater than 10 mm and an equivalent diameter, measured at half-length, of greater than 2 μm and less than 50 μm; and
the ceramic fibers, optionally assembled in the form of yarns, represent more than 90% of the mass of the support, said ceramic fibers, optionally assembled in the form of yarns, comprising more than 90% by weight of oxide(s) and/or of nitride(s) and/or of carbide(s) and/or of boride(s) and/or of carbon;
the support being a single yarn, a web of yarns, a braid of yarns, a knit of yarns or an entanglement of fibers, said single yarn or more than 50% of the yarns or of the fibers, as percentage by number, being coated, for more than 50% of their outer surfaces, with liquefiable gel.

11. The prepreg as claimed in claim 1, in which,
in the liquefiable gel,
the total amount of the ceramic particles in the liquefiable gel and of the ceramic particles formed by said heat treatment is greater than 25% and less than 55%, as percentage by volume based on the volume of the liquefiable gel, the ceramic particles of the liquefiable gel and the ceramic particles formed by said heat treatment being chosen from particles comprising more than 90% by weight of oxide(s), particles comprising more than 90% by weight consisting of nitride(s), particles comprising more than 90% by weight consisting of carbide(s), particles comprising more than 90% by weight consisting of boride(s), and mixtures of these particles; and
the total amount of the metallic particles in the liquefiable gel and of the metallic particles formed by said heat treatment is greater than 0.5% and less than 9%, as percentage by volume based on the volume of the liquefiable gel,
the whole of said ceramic particles of the liquefiable gel, of said ceramic particles formed by said heat treatment, of said metallic particles of the liquefiable gel, and of said metallic particles formed by said heat treatment exhibiting, by volume, a median size $D_{50}$ of less than 5 μm and greater than 0.1 μm, and a 99 percentile, $D_{99}$, of less than 50 μm;
the thermoreversible hydrocolloid is present in an amount of greater than 0.4% and less than 9%, as percentage by mass based on the sum of the mass of said ceramic particles of the liquefiable gel, of said ceramic particles formed by said heat treatment, of said metallic particles of the liquefiable gel, and of said metallic particles formed by said heat treatment; and being chosen from a gelatin, agar, a mixture of carrageenan and of a compound providing sodium cations and/or potassium cations and/or calcium cations, a mixture of furcellaria and of a sugar, a mixture of konjac gum and of xanthan gum, in a mass ratio of greater than 0.8 and less than 1.2, a mixture of locust bean gum and of xanthan gum, in a mass ratio of greater than 0.67 and less than 1.5, a mixture of chitosan and of pectin, having a mass ratio of the amount of pectin to the amount of pectin and of chitosan of greater than 0.2 and less than 0.8; and the other constituents are organic and present in an amount of greater than 0.1% and less than 6%, as percentage by mass based on the sum of the mass of said ceramic particles of the liquefiable gel, of said ceramic particles formed by said heat treatment, of said metallic particles of the liquefiable gel, and of said metallic particles formed by said heat treatment, said other constituents being chosen from dispersants, binders, biocidal agents, antifoam agents, thickeners, plasticizers, drying regulators and mixtures thereof; and in the support, more than 90% by number of the ceramic fibers of the support, optionally assembled in the form of yarns, have a length of greater than 10 mm and an equivalent diameter, measured at half-length, of greater than 2 μm and less than 50 μm; and the ceramic fibers, optionally assembled in the form of yarns, represent more than 90% of the mass of the support, said ceramic fibers, optionally assembled in the form of yarns, comprising more than 90% by weight of oxide(s) and/or of nitride(s) and/or of carbide(s) and/or of boride(s) and/or of carbon;

the support being a single yarn, a web of yarns, a braid of yarns, a knit of yarns or an entanglement of fibers, said single yarn or more than 50% of the yarns or of the fibers, as percentage by number, being coated, for more than 50% of their outer surfaces, with liquefiable gel.

12. The prepreg as claimed in claim 1, in which:

the thermoreversible hydrocolloid is present in an amount of less than 7%, as percentage by mass based on the total mass of said ceramic particles of the liquefiable gel, of said ceramic particles formed by said heat treatment, of said metallic particles of the liquefiable gel, and of said metallic particles formed by said heat treatment.

13. The prepreg as claimed in claim 1, in which, in the liquefiable gel, the total amount of the ceramic particles in the liquefiable gel and of the ceramic particles formed by said heat treatment is greater than 30% and less than 50%, as percentage by volume based on the volume of the liquefiable gel, more than 95% by volume of the set of particles comprising said ceramic particles of the liquefiable gel and of said ceramic particles formed by said heat treatment comprising more than 99% by weight of oxide(s), and exhibiting a chemical analysis such that $Al_2O_3+SiO_2 \geq 95\%$, as percentage by mass based on the oxides; and the whole of the said ceramic particles of the liquefiable gel and of said ceramic particles formed by said heat treatment exhibiting, by volume, a median size $D_{50}$ of less than 5 μm and greater than 0.1 μm, and a 99 percentile, $D_{99}$, of less than 50 μm; and the thermoreversible hydrocolloid is present in an amount of greater than 0.5% and less than 4%, as percentage by mass based on the mass of the ceramic particles, said thermoreversible hydrocolloid being a gelatin; and the other constituents are organic and present in an amount of greater than 0.1% and less than 6%, as percentage by mass based on the mass of the ceramic particles, said other organic constituents being chosen from dispersants, binders, biocidal agents, antifoam agents, thickeners, plasticizers, drying regulators and mixtures thereof; and in the support, more than 90% by number of the ceramic fibers of the support, optionally assembled in the form of yarns, have a length of greater than 10 mm and an equivalent diameter, measured at half-length, of greater than 2 μm and less than 30 μm; and the ceramic fibers, optionally assembled in the form of yarns, represent more than 90% of the mass of the support, and said ceramic fibers, optionally assembled in the form of yarns, comprising more than 95% by weight of oxide(s) and exhibiting a chemical analysis such that $Al_2O_3+SiO_2 \geq 95\%$, as percentage by mass based on the oxides;

the support being a single yarn, a web of yarns, a braid of yarns, a knit of yarns or an entanglement of fibers, said yarn or more than 50% of the yarns or of the fibers, as percentage by number, being coated, for more than 50% of their outer surfaces, with liquefiable gel.

14. The prepreg as claimed in claim 1, in which:

the total amount of the metallic particles in the liquefiable gel and of the metallic particles formed by said heat treatment is greater than 0.5% and less than 9%, as percentage by volume based on the volume of the liquefiable gel; and/or one or more other constituents are present in an amount of greater than 0.5% and less than 6%, as percentage by mass based on the total mass of said ceramic particles of the liquefiable gel, of said ceramic particles formed by said heat treatment, of said metallic particles of the liquefiable gel, and of said metallic particles formed by said heat treatment.

15. The prepreg as claimed in claim 14, in which the thermoreversible hydrocolloid is in an amount of greater than 0.5% and less than 4%, as percentage by mass based on the total mass of said ceramic particles of the liquefiable gel, of said ceramic particles formed by said heat treatment, of said metallic particles of the liquefiable gel, and of said metallic particles formed by said heat treatment and/or the other constituent(s) is/are organic and chosen from dispersants, binders, biocidal agents, antifoam agents, thickeners, plasticizers, drying regulators and mixtures thereof.

16. The prepreg as claimed in claim 1, in which the ratio of the amount by mass of said other constituents to the amount by mass of thermoreversible hydrocolloid is less than 1, the amounts of thermoreversible hydrocolloid and of the "other constituents" being expressed as percentage by mass based on the total mass of said ceramic particles of the liquefiable gel, of said ceramic particles formed by said heat treatment, of said metallic particles of the liquefiable gel, and of said metallic particles formed by said heat treatment.

17. The prepreg as claimed in claim 16, in which said ratio is less than 0.6.

18. A kit comprising a prepreg as claimed in claim 1, and a hermetic bag, said prepreg being packed in said hermetic bag.

19. A method for manufacturing a prepreg according to claim 1, said method comprising the following steps:

1) preparing a gellable liquid having the following composition:

20% to 60% of ceramic particles, as percentage by volume based on the volume of the gellable liquid;

0% to 10% of metallic particles, as percentage by volume based on the volume of the gellable liquid;

0.2% to 10% of a thermoreversible hydrocolloid, as percentage by mass based on the total mass of the ceramic particles and of the metallic particles;

0% to 7% of one or more other constituents, as percentage by mass based on the total mass of the ceramic particles and of the metallic particles;

the remainder to 100% being water;

2) applying said gellable liquid to ceramic fibers of a fibrous support;

3) gelling said gellable liquid in the form of a liquefiable gel by reducing the temperature of said gellable liquid, so as to obtain the prepreg;

4) storing the prepreg.

20. The method for manufacturing a prepreg as claimed in claim 19, in which the thermoreversible hydrocolloid is chosen so that the gelling temperature of the gellable liquid is greater than 20° C. and less than 60° C.

21. A method for manufacturing a ceramic matrix component, said method comprising the following steps:

5) liquefying the liquefiable gel of a prepreg as claimed in claim 1, so as to transform the liquefiable gel into gellable liquid;

6) shaping said prepreg so as to obtain a deformable preform;

7) optionally, gelling the gellable liquid, so as to obtain a stiffened preform;

8) drying the preform obtained from step 6) or optionally from step 7) so as to obtain a ceramic matrix component;

9) optionally, sintering the ceramic matrix component obtained from step 8).

22. A method for preserving a prepreg as claimed in claim 1, in which said prepreg is stored for more than 1 month.

23. The method for preserving a prepreg as claimed in claim 1, in which said prepreg is stored for more than 6 months.

* * * * *